United States Patent [19]

Kemper

[11] 4,454,782
[45] Jun. 19, 1984

[54] TORQUE TRANSMITTING BODY FOR TRACTION DRIVE TRANSMISSIONS AND NORMAL FRICTION FORCE DEVELOPING METHOD

[75] Inventor: Yves J. Kemper, Birmingham, Mich.

[73] Assignee: Vadetec Corporation, Troy, Mich.

[21] Appl. No.: 336,399

[22] PCT Filed: May 19, 1980

[86] PCT No.: PCT/US80/00583

§ 371 Date: Dec. 23, 1981

§ 102(e) Date: Dec. 23, 1981

[87] PCT Pub. No.: WO81/03366

PCT Pub. Date: Nov. 26, 1981

[51] Int. Cl.³ ..................... F16H 15/16; F16H 13/00; F16H 15/50
[52] U.S. Cl. ...................................... 74/191; 74/208; 74/796
[58] Field of Search ................ 74/190, 191, 690, 193, 74/192, 796, 752 C

[56] References Cited

U.S. PATENT DOCUMENTS

| 4,112,779 | 9/1978 | Kemper et al. | 74/191 |
| 4,112,780 | 9/1978 | Kemper et al. | 74/191 |
| 4,152,946 | 5/1979 | Kemper | 74/193 |
| 4,258,581 | 3/1981 | Kemper et al. | 74/192 |

Primary Examiner—Lawrence J. Staab
Assistant Examiner—Michael D. Bednarek
Attorney, Agent, or Firm—Ziems, Walter & Shannon

[57] ABSTRACT

A nutating traction drive in which external rolling surfaces on a one-piece biconical body (10) are retained against axially spaced internal ring surfaces (51,52) at diametrically opposite points of contact by a mechanism acting between a body (18) which is rotatable on the axis of the ring surfaces or a first axis (24) and which carries the biconical body (10) on a second axis (30) inclined with respect to and intersecting the first axis at a point (S) of axes intersection located midway between the ring surfaces (51,52) and points of contact. The mechanism includes a pivotal member (66) having a fulcrum point (78) eccentric from the first axis (24) or displaced from a plane containing both the first (24) and second (30) axes so that a torque reaction to rotation of the carrying body (18) by the biconical body (10) results in a force attempting to increase the angle between the first (24) and second (30) axes. A preloading device (82) acting to rock the pivot member (66) in one direction provides a preload bias of the rolling surfaces against each other whereas an unloading device (84) operating to swing the pivot member in the opposite direction results in a removal of normal friction force between the engaged rolling surfaces.

8 Claims, 5 Drawing Figures

TORQUE TRANSMITTING BODY FOR TRACTION DRIVE TRANSMISSIONS AND NORMAL FRICTION FORCE DEVELOPING METHOD

BACKGROUND OF THE INVENTION

This invention relates to continuously variable traction drive transmissions and more particularly, it concerns improvements in torque transmitting bodies for such transmissions as well as in a method and structure for forcing complementary rolling surfaces incorporated in such transmissions into frictional torque transmitting engagement with each other.

In U.S. Pat. Nos. 4,112,779, No. 4,112,780 and No. 4,152,946 several continuously variable transmission body and where it is a rotatable omega body. By coupling the shaft either directly or indirectly to the transmission output load, the force by which the cone members would be urged against the ring-like members could be made proportional to output load. A major difficulty with this approach to normal force development is that the nature and magnitude of the loads imposed on the assembly of cone members and shaft tend to deflect the shaft relative to the cone members causing the cone members to bind or otherwise develop an unwanted path of torque transmission between the shaft and the cone members. The effectiveness of the cam or ramp system operative between the shaft and the cone members is, therefore, reduced with the result that the normal forces developed at the points of frictional developing means enables the traction surfaces on the respective beta and omega bodies to be withdrawn from contact with each other.

A primary object of the present invention is, therefore, the provision of an unique one-piece biconical body for transmissions of the class described together with an unique normal force developing mechanism and method by which traction surfaces on the biconical body are retained in rolling friction engagement with a complementing body at two diametrically opposite points of rolling friction contact. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
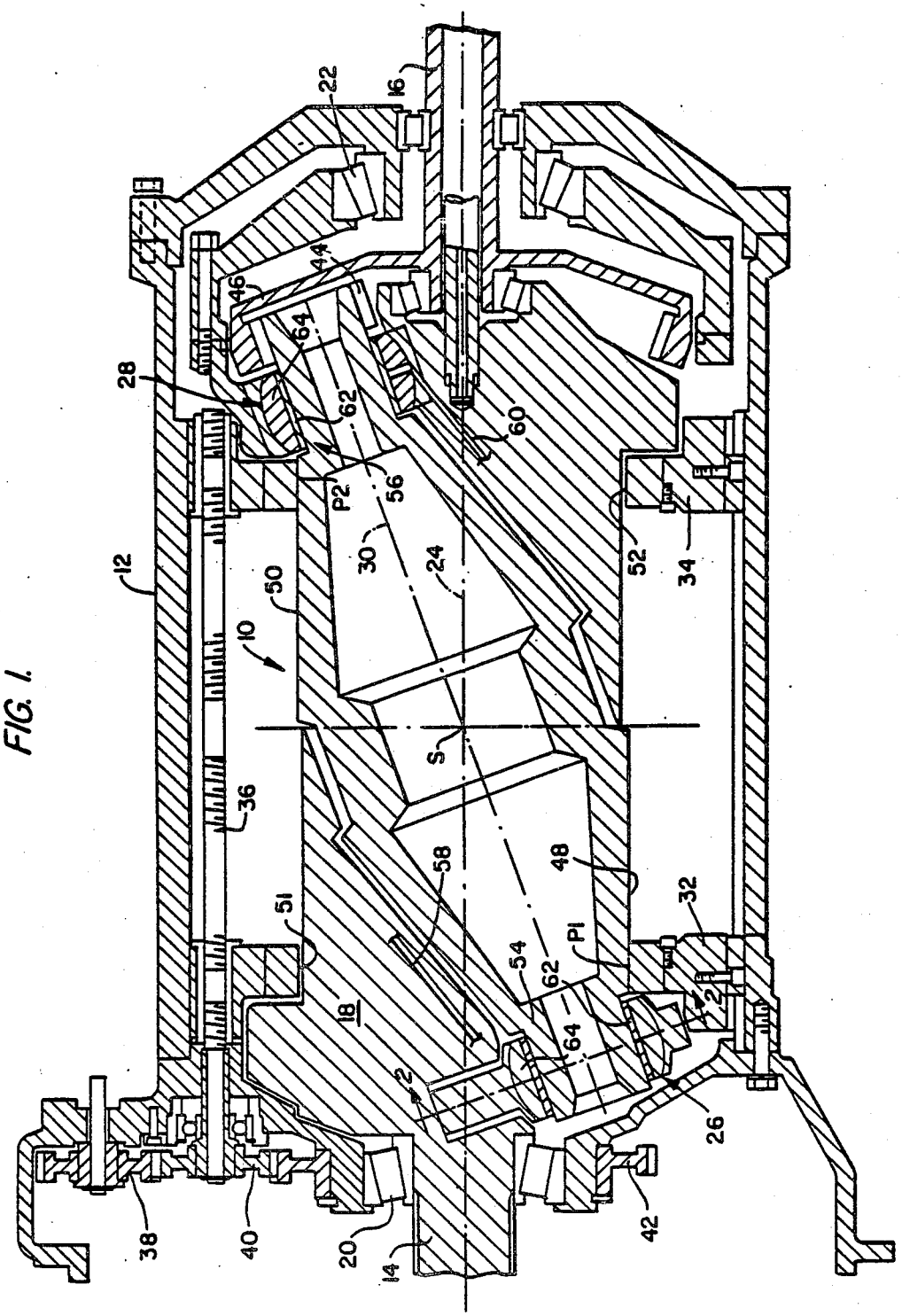
FIG. 1 is a longitudinal cross-sectional view through a transmission embodiment incorporating the present invention.

In FIG. 1 of the drawings, a biconical torque transmitting or beta body, generally designated by the reference numeral 10, is shown incorporated in a continuously variable transmission unit having a frame 12, an input shaft 14 and an output shaft 16. Although the operating principles as well as many alternative structural embodiments of the overall transmission are disclosed in the aforementioned U.S. Pat. Nos. 4,112,779, No. 4,112,780 and No. 4,152,946 as well as in other commonly assigned patents and applications for patents, the transmission embodiment illustrated in FIG. 1 will be described summarily herein in the interest of providing a complete understanding of the present invention.

As may be seen in FIG. 1, the input shaft 14 is connected as an integral shaft extension with an alpha body 18 supported in the frame 12 by bearings 20 and 22 for rotation about a first axis 24. The beta body 10, in turn, is supported from the alpha body 18 by bearings 26 and 28 to be rotatable on a second axis 30 inclined with respect to and intersecting the first axis 24 at a point S of axes intersection. Supported by and coupled against rotation with respect to the frame 12 are a pair of omega rings 32 and 34 which are capable of axial adjustment toward and away from the point S of axes intersection. In the illustrated transmission, the rings 32 and 34, though separate and movable axially in relation to each other, are coupled through the frame 12 as a single torque body and as such, constitute the omega body of the transmission shown.

In the disclosed embodiment, axial adjustment of the omega rings 32 and 34 is effected by one or more oppositely pitched screws 36 rotatable by an external control (not shown) through gears 38 and 40 which are rotatable on axes fixed with respect to the frame 12. An additional control gear 42, rotatable with respect to the frame 12, is shown and in practice is used to synchronize rotation of the gear 40 with corresponding gears for additional sets of double pitched screws (not shown). A pinion gear 44 connected directly to the biconical beta body 10, meshes with a ring gear 46 coupled directly with the output shaft 16.

Consistent with the several transmission embodiments disclosed in the aforementioned U.S. patents, the biconical beta body 10 in the illustrated embodiment defines a pair of external conical surfaces 48 and 50 to engage complementing internal traction surfaces 51 and 52 on the omega rings 32 and 34 at two diametrically opposite points of contact P1 and P2. As a result of this frictional contact between the biconical body 10 and the rings 32 and 34, the rotational speed of the output shaft 16 is the product of both rotation of the alpha body 18 on the first axis 24, causing orbital or planetary movement of the pinion gear 44, and rotation of the pinion gear with the biconical beta body 10 on the axis 30. Thus, where $\alpha$ is the rotational speed of the alpha body 18 about the axis 24; $\theta$ is the speed of rotation in the output shaft 16; $\rho$ is the ratio of the traction surface radius of the rings 32 and 34 to the radii of the conical surfaces 48 and 50 at the contact points P1 and P2; and k is the diametric ratio of the pinion gear 44 to the ring gear 46, the output/input speed ratio of the transmission is determined by the equation:

$$\theta/\alpha = 1 - k\rho.$$

It will be apparent particularly from the several embodiments disclosed in U.S. Pat. No. 4,152,946 that this equation of output/input speed ratios represents but one mode of operating the general type of transmission represented by the embodiment illustrated in FIG. 1. Also in this respect, it should be noted that in the illustrated embodiment the biconical member 10 undergoes a nutational movement as a result of its being supported on the second axis 30 by the alpha body 18. In other forms of the same basic transmission and as disclosed in U.S. Pat. No. 4,152,946, the biconical body 10 may be concentric with the first axis 24 as the omega body and coupled directly with an output shaft whereas the rings 32 and 34 are concentric with the second axis 30 as the beta body and, as such, carried in nutation by the equivalent of the alpha body 18. As will be apparent from the description to follow, the structure and function of the biconical body 10 is equally applicable to either form of transmission in this general class.

As illustrated in FIG. 1 and in accordance with the present invention, the biconical body 10 is an integral or one-piece structure shaped externally to provide the frusto-conical traction surfaces 48 and 50 and having axially extending hub formations 54 and 56 at opposite ends. Preferably though not necessarily, the body 10 is hollow for reduced weight and to facilitate cooling. In this latter respect, both hubs 54 and 56 are also hollow to provide fluid communication throughout the length of the body 10.

The bearings 26 and 28 by which the body 10 is supported from the alpha body 18 are preferably hydrodynamic bearings supplied with lubrication by porting 58 and 60 within the alpha body 18. Each of the bearings 26 and 28 includes an internal bushing or sleeve 62 on the interior of a spherical bearing pad 64. Each of the hubs 54 and 56 is, moreover, of a length greater than the length of the bushings 62 so that in the absence of any other restraint, the body 10 will be permitted sliding motion to a limited extent along the second axis 30. The spherical bearing pads 64 will, moreover, provide a similar freedom from restraint against universal pivotal movement of either hub 54 or 56 about the spherical center of pads 64. It will be appreciated, therefore, that while the bearings 26 and 28 support the beta body 10 for rotation relative to the alpha body 18, the body 10 is supported with freedom from axial restraint by the bearings along the second axis 30.

Figure 2:
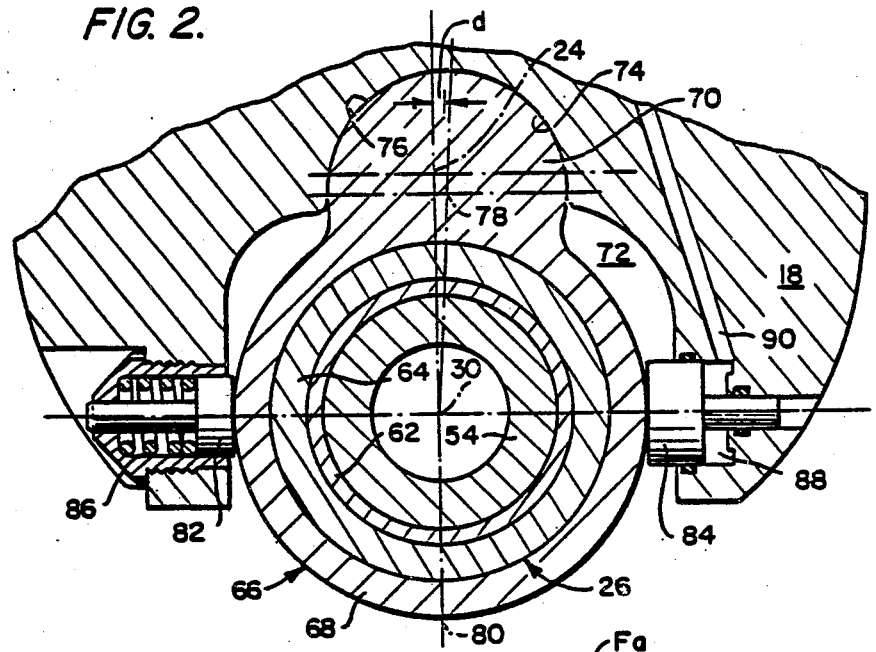
FIG. 2 is an enlarged fragmentary cross-section on line 2—2 of FIG. 1.

As shown in FIGS. 1 and 2 of the drawings, the bearing 26 at one end of the beta body 10 is carried from the alpha body 18 by an eccentric member 66 having a flanged ring portion 68 to receive the spherical bearing pad 64 and a semicylindrical lobe-like portion 70. As shown in FIG. 2 the eccentric member 66 fits within the recess 72 in the alpha body which is shaped to define a semicylindrical bearing surface 74 which complements the circular peripheral portion 76 of the lobe-like formation 70. Both of the surfaces 74 and 76 are concentric with a point or axis 78 which is eccentric with respect to the first or primary transmission axis 24 on which the alpha body 18 is rotatable. Also it will be noted that the point or axis 78 is offset from a plane 80 containing both the first axis 24 and the second axis 30 by a distance d and in a direction from which torque is transmitted between the alpha body 18 and the beta body 10. In this latter context, the point 78 is oriented with respect to the first axis 24 as if the alpha body 18 were driven in a clockwise direction of rotation in FIG. 2 or in a direction tending to move the point 78 toward the plane 80. As a result of such torque, the eccentricity of the point 78 from the axis 24 will develop a thrusting force against the bearing 26 perpendicular to the second axis 30 and in a direction tending to advance the bearing 26 radially outward from the alpha body 18.

Again as shown in FIG. 2, the eccentric member 66 is positioned in the alpha body recess 72 to be located diametrically between a yieldable preload plunger 82 and a hydraulic retraction plunger 84. The preload plunger 82 is retained in engagement with the member 66 under the bias of a compression spring 86 whereas the plunger 84 is received in a chamber 88 to which hydraulic fluid may be introduced under pressure through porting 90.

Figure 4:
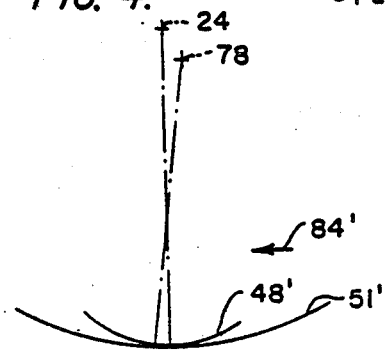
FIGS. 4 and 5 are schematic diagrams depicting an operational characteristic of the invention.
Figure 5:
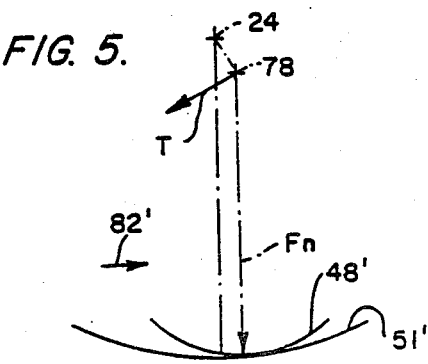

The operation of the plungers 82 and 84 may be appreciated by the diagrams illustrated in FIGS. 4 and 5 of the drawings. In these figures, the rolling traction surfaces 48 on the beta body 10 are represented by an arc 48' whereas the traction surfaces 51 and 52 are represented by an arc 51'. It is to be understood that these schematic illustrations are grossly exaggerated for illustrative purposes and not to scale. In FIG. 5, however, it will be seen that a torque force acting in the direction of the arrow T will develop a force component F urging the surface 48' into engagement with the surface 51', the latter being concentric with the axis 24. It will be equally appreciated that the spring biased plunger 82 acting in the direction of the arrow 82' in FIG. 5 will augment the force F and assure contact of the surfaces 48' and 51' under a preload bias. On other hand, and with reference to FIG. 4, movement of the hydraulic plunger 84 in the direction of the arrow 84' will cause the eccentric member 66 to pivot about the axis 78 against the spring biased plunger 82. This action will result in a separation of the surfaces 48' and 51' or at least a complete removal of forces retaining the surfaces 48' and 51' in rolling frictional engagement. Thus, the conical surfaces 48 and 50 on the beta body 10 may be withdrawn from contact with the omega ring traction surfaces 51 and 52 at the diametrically opposite points P1 and P2 to achieve a neutral or disengaged condition.

Figure 3:
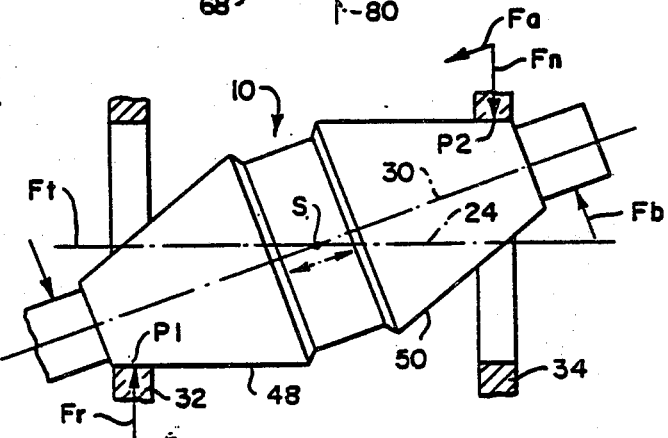
FIG. 3 is a schematic side elevation illustrating force components developed in accordance with the present invention.

Although the thrusting force between the alpha body 18 and the beta body 10 is through only the bearing 26 or at one end of the beta body, this initial thrusting force is resolved into substantially equal normal force loading components at the points P1 and P2 of rolling friction contact. The resolution of forces acting to retain the beta body rolling surfaces in engagement with those of the omega rings 32 and 34 may be appreciated by reference to FIG. 3 of the drawings. In particular, it will be noted that the initial thrusting force $F_t$ is in the direction of the arrow so designated and, as such, is perpendicular to the second axis 30. The thrusting force is opposed by a reaction force $F_r$ as a result of the ring 32 engaging the conical surface 48 at the point P1. Because the rings 32 and 34 are concentric with the first axis 24, however, the effective direction of the reacton $F_r$ will be perpendicular to the first axis 24. The angle between the axes 24 and 30 and thus the angle at which the forces $F_t$ and $F_r$ act, will develop an axial force component $F_a$ which is opposed by an equal and opposite force at the point P2. This, in turn, develops a force component $F_n$ at the point P2 which is equal to the force $F_r$ and which is opposed in part by a force $F_b$ at the bearing 28. In other words, because the beta body 10 is supported by the bearings 26 and 28 with freedom for movement along the axis 30, the application of the initial thrusting force $F_t$ at only one end is inconsequential as a result of the facility for the beta body to center itself between the rings 32 and 34.

It will be appreciated from the foregoing that as a result of the present invention, a highly effective normal force loading system and method is provided with an extremely simple beta body structure. The facility provided for withdrawing the rolling surfaces on the respective beta body and omega rings is, moreover, important to many applications of transmissions of this general class. Where the transmission in used in a drive line in which a rapid movement of the rings 32 and 34 may be required for shifting between ranges of speed ratios, for example, the retraction of the rolling friction surfaces is important. Also, it permits applications of the transmission with various gearing combinations other than that shown in FIG. 1 of the drawings to the extent that by holding the alpha member against rotation as well as holding the omega rings against rotation, the gearing may be used as a supplement to use in cooperation with the continuously variable transmission.

It is contemplated that modifications and/or changes may be made in the embodiment disclosed herein without departure from the present invention. It is expressly intended, therefore, that the foregoing description and accompanying drawings are illustrative of a preferred embodiment only, not limiting, and that the true spirit and scope of the present invention will be determined by reference to the appended claims.

I claim:

1. In a continuously variable transmission having an alpha body rotatable about a first axis, a beta body supported from said alpha body and defining rolling surfaces of revolution about a second axis inclined at an angle with respect to and intersecting and first axis at a point of axes intersection, and an omega body defining rolling surfaces of revolution about said first axis, the rolling surfaces on said beta and omega bodies being in rolling frictional engagement at two diametrically opposite points of contact located in a plane containing said first and second axes, the improvement comprising:
  means to support said beta body from said alpha body with freedom of said beta and omega bodies to be self-centering on said point of axes intersection; and
  means to develop a radial thrusting force between said alpha body and said beta body, said thrusting force being applied perpendicular to said second axis and in a direction toward one of the rolling surfaces on said omega body, whereby the angular orientation of said first and second axes together with the freedom of said beta and omega bodies to be self-centering operates to resolve said thrusting force equally at said two points of contact.

2. The apparatus as recited in claim 1, wherein said means to support said beta body from said alpha body comprises bearing means to permit limited axial movement of said beta body along said second axis.

3. The apparatus as recited in claim 2, wherein said bearing means permit freedom from pivotal restraint in a sphere concentric with the respective points of beta body support.

4. The apparatus as recited in claim 1, wherein said means to develop a radial thrusting force comprises pivotal means supporting one end of said beta body from said alpha body, said pivotal means having a pivot axis eccentric with respect to said first axis.

5. The apparatus as recited in claim 4, wherein said pivot axis is located between said first and second axes and is displaced from a plane containing said first and second axes.

6. The apparatus as recited in claim 5, including a preloading means acting between said alpha body and said pivotal means in a direction tending to displace said second axes into a plane containing said first axis and said pivot axis.

7. The apparatus as recited in either of claims 5 or 6, including retraction means acting between said pivotal means and said alpha body in a direction tending to displace a plane containing said first and second axes further from said pivot axis and thereby swing the rolling surfaces on said beta body in a direction away from the rolling surfaces on said omega body.

8. The method of developing normal force components for retaining rolling surfaces in frictional engagement in a continuously variable transmission having an alpha body rotatable about a first axis, a beta body supported from said alpha body and defining rolling surfaces of revolution about a second axis inclined at an angle with respect to and intersecting said first axis at a point of axes intersection, and an omega body defining rolling surfaces of revolution about said first axis, the rolling surfaces on said beta and omega bodies being in rolling frictional engagement at two diametrically opposite points of contact located in a plane containing said first and second axis, said method comprising the steps of:
  supporting said beta body from said alpha body to allow limited axial movement of said beta body relative to said omega body; and
  developing a radial thrusting force between said alpha and beta bodies in a direction perpendicular to said second axis in a direction urging said beta body toward one of the rolling surfaces on said omega body.

* * * * *